UNITED STATES PATENT OFFICE.

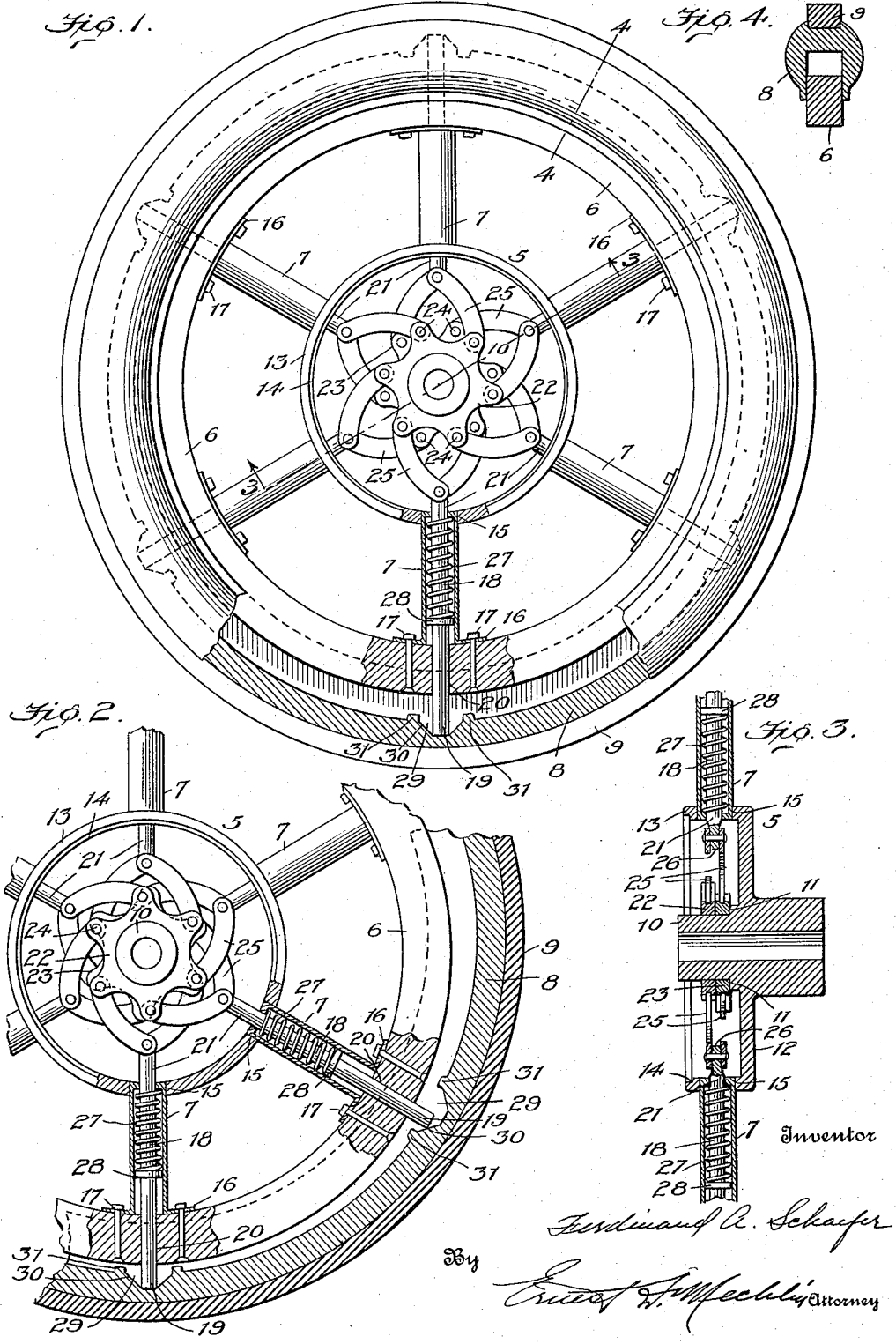
F. A. SCHAEFER.
VEHICLE WHEEL.
APPLICATION FILED JUNE 26, 1915.
1,156,318.
Patented Oct. 12, 1915.

FERDINAND A. SCHAEFER, OF RASPEBURG, MARYLAND, ASSIGNOR OF ONE-HALF TO GEORGE R. RIGGS, OF WASHINGTON, DISTRICT OF COLUMBIA.

VEHICLE-WHEEL.

1,156,318. Specification of Letters Patent. Patented Oct. 12, 1915.

Application filed June 26, 1915. Serial No. 36,421.

*To all whom it may concern:*

Be it known that I, FERDINAND A. SCHAEFER, a citizen of the United States, residing at Raspeburg, in the county of Baltimore and State of Maryland, have invented certain new and useful Improvements in Vehicle-Wheels; and I do hereby declare the following to be a full, clear, and exact description of the invention, such as will enable others skilled in the art to which it appertains to make and use the same.

The invention relates to vehicle wheels, and more particularly to wheels for motor-propelled vehicles.

To this end, the main features of my invention, generally stated, consist in providing a vehicle wheel having a plurality of movably mounted spoke members each preferably radially arranged and adapted to bear at one extremity against a rim member and means mounted upon the hub member and so connected to the other extremity of each spoke member that a movement of one spoke member will produce a corresponding movement of each and all the other spoke members.

There are other features of the invention, as will appear from a more detailed description, taken in connection with the accompanying drawing, chosen for the purpose of illustrating one form of the invention, wherein:

Figure 1 is a side elevation, partly in section, of a vehicle wheel constructed in accordance with the invention. Fig. 2 is a view similar to Fig. 1, showing the various parts in the position they assume under a load. Figs. 3 and 4 are detail section views taken respectively on lines 3—3 and 4—4 of Fig. 1.

The vehicle wheel chosen for the purpose of illustrating the invention comprises a hub portion 5, a felly 6, a plurality of preferably hollow casing members 7 rigidly uniting the hub and felly and serving to hold the felly in spaced relation to the hub member and preferably a rigid floating rim member 8, on the outer face of which may be mounted the tire member 9.

The hub member 5 preferably consists of a central spindle 10 which may be provided with a shoulder 11, as shown, the purpose of which will be hereinafter described, spaced from the spindle 10 and concentric therewith and preferably integrally connected thereto by the flange 12 is the outer hub member 13. On the inner face and near one edge, the said member 13 may be provided with a seat portion 14 adapted to receive a cover or dust-plate (not shown).

To the outer hub member 13 are connected the casing members 7, the said hub member having openings or seats 15 therein to closely receive the inner ends of the said casings and in which openings or seats the casing members are adapted to be firmly secured, as for example, by welding. The outer ends of each of the casing members may be provided with an out-turned flange 16 adapted to contact with the inner face of the felly 6 and each flange and the adjacent portion of the felly are preferably provided with registering holes adapted to receive headed bolts 17 or other fastening means to rigidly connect the casing members 7 to the felly 6. It is to be understood, however, the manner of connecting the casing members to the hub and felly may be widely modified and that the foregoing description is merely illustrative of one form and is not to be taken in a limiting sense.

Passing through each casing member 7 is (preferably) a movable spoke member 18, the outer end 19 of each being adapted to pass through an opening 20 in the felly and contact in normal position with the inner face of the rim member 8. The inner end 21 of each spoke member preferably extends into the space between the spindle 10 and the outer hub member 13.

The means for connecting the spoke members is preferably located within the outer hub member 13 and includes relatively rotatable members, which members may for convenience be formed as sprocket-shaped members 22 and 23, these members being held in proper position on the spindle 10 by the shoulder 11 hereinbefore described; each sprocket-shaped member is provided with a plurality of pivots 24, the number of pivots corresponding to the number of spoke members with which the wheel may be provided. Pivotally connected to each of the pivots 24 is a link member 25, the links 25 which are connected to the sprocket member 22 extend in a counter-clockwise direction, while the links connected to the member 23 extend in a clockwise direction.

Each spoke member 18 is provided at its inner end 21 with a reduced portion 26, and to the portion 26 of each spoke member may be connected by means of the pivot pin 27 the outer ends of two links 25, one of said links being connected to the sprocket member 22, and the other to the sprocket member 23. It will thus be evident that by using the rotatably mounted members 22 and 23, and by connecting spaced points on each member with the inner ends of the respective spoke members by means of the oppositely extending links, I produce in effect a toggle mechanism, in which each spoke member is connected to a toggle, and that an inward movement of a spoke member will cause a spreading movement of the link members connected thereto and thereby produce a relative rotation of the sprocket members and an inward movement of all of the other spoke members.

In each casing member and surrounding the spoke member therein is seated a coil spring 27, the said spring bearing against a collar 28 provided on the spoke member 18. Each spring is preferably placed under a slight initial compression, the amount of compression depending upon the weight of the vehicle for which the wheel is intended.

In order to prevent the rim member from moving circumferentially with reference to the spoke members, there is provided on the inner face of the rim 8 sockets or pockets 29 adapted to receive the ends of the respective spoke members. These pockets are provided with inclined side walls 30 in order to permit the normal operation of the device, and are further provided with upstanding shoulders 31 to act as stops to prevent a spoke member from passing entirely out of its pocket.

It is believed that the operation of the device will be evident from the foregoing description. It will be noted, however, that a downward movement of the hub member or an upward movement of the rim member will place a direct compression upon the lowermost spoke member, directly compressing its spring and at the same time causing the links connected to the said spoke member to spread, thus producing rotation in opposite directions of the sprocket members. This produces a corresponding inward movement of all of the spoke members and, therefore, a corresponding compression of their spring members. It will be noted also that on the inward movement of a spoke member the angle between links connected thereto becomes greater, and as the angle grows greater the force required to change the angle must decrease, thereby giving a differential action and preventing sudden shocks and jars from being transmitted to the vehicle.

It will thus be seen that I have produced a vehicle wheel possessing great resiliency and also the necessary stability and strength required without having, however, the inherent defects which the pneumatic tired wheel of the present day possesses.

It is to be understood that the foregoing description of one embodiment of the invention is merely illustrative, and not to be taken in a limiting sense, since what I claim and desire to secure by Letters Patent is:

I claim:

1. In a wheel, the combination of a plurality of radially arranged spoke members, toggle means connected to the spoke members, said means being adapted on a radial displacement of one spoke member to cause a like movement in a radial direction of all of the other spoke members.

2. In a wheel, the combination of a rigid floating rim, a plurality of radially arranged spoke members, a hub member, toggle means connected to said spoke members, said means being adapted on a relative displacement of the said hub and rim members to produce a displacement of some of the spoke members and means for returning said spoke members to normal.

3. In a wheel, the combination of a hub member, a rim member, a plurality of movable spoke members and means connecting the spoke members and adapted to convert a compression strain on one spoke member into a tension strain upon the other spoke members.

4. In a wheel, the combination of a hub member, a rim member, a plurality of rigid movable spoke members, connecting said hub and rim members, and rotatable means connecting the spoke members and adapted to convert a compression strain on one spoke member into a tension strain upon the other spoke members.

5. In a wheel, the combination of a plurality of resiliently mounted spoke members, a hub member, a rim member and means adapted in any given position of rotation of the wheel to convert a compression strain upon one or more spoke members into a tension strain upon the remaining spoke members.

6. In a wheel, the combination of a hub member, a plurality of relatively rotatable members mounted thereon, a plurality of radially arranged and resiliently supported spoke members, a rim member, and means for connecting each spoke member to the said rotatable members.

7. In a wheel, the combination of a hub member, a plurality of spring controlled spoke members, a rim member, a plurality of relatively rotatable members mounted upon the said hub member, and a plurality of means for connecting each spoke member to said rotatable members, each of said connecting means involving a pair of links which are connected to a spoke and which are respectively connected to the relatively rotatable members, said means connecting the spoke members to the said hub member.

8. In a wheel, the combination of a hub member, a plurality of resiliently mounted spoke members, a rim member having on the inner face thereof a plurality of pockets having inclined side walls, the said spoke members being adapted to extend into the said pockets in the rim member, and means adjacent the side walls of the said pockets adapted to prevent said spoke members from moving out of said pockets upon a relative rotation of said hub and rim.

9. In a wheel, the combination of a hub member, a felly spaced therefrom and rigidly connected thereto, a floating rim member, a plurality of resiliently mounted spoke members connected to said hub member and extending through said felly and normally contacting with said rim member and means operated by a movement of one or more of the spoke members to cause a movement of all of the other spoke members.

10. In a wheel, the combination of a hub member, a rim member which is relatively rotatable with respect thereto, means for yieldingly connecting said hub and rim members, said means including a plurality of relatively rotatable members mounted on said hub member and means whereby a relative rotation of said hub and rim energizes said means for yieldingly connecting said relatively rotatable members.

11. In a wheel, the combination of a hub member, a floating rim member, means involving spokes for yieldingly connecting said hub and floating rim and means for converting compression induced in one or more of said spokes by the displacement of the floating rim with respect to said hub into tension in the remaining spokes.

12. In a wheel, the combination of a hub member, of a felly mounted in fixed relation thereto, a floating rim member, means involving spokes for yieldingly connecting said hub and floating rim and means for converting compression induced in one or more of said spokes by the displacement of the floating rim with respect to said hub into tension in the remaining spokes.

13. In a wheel, the combination of a hub member, of a felly mounted in fixed relation thereto, a floating rim member, means involving radially arranged spokes for yieldingly connecting said hub and floating rim and means for converting compression induced in one or more of said spokes by the displacement of the floating rim with respect to said hub into tension in the remaining spokes.

In testimony whereof I affix my signature.

FERDINAND A. SCHAEFER.

Copies of this patent may be obtained for five cents each, by addressing the "Commissioner of Patents, Washington, D. C."